(No Model.) 2 Sheets—Sheet 1.
J. A. GLEIXNER & P. SCHAFF.
SEED SOWER.
No. 515,208. Patented Feb. 20, 1894.
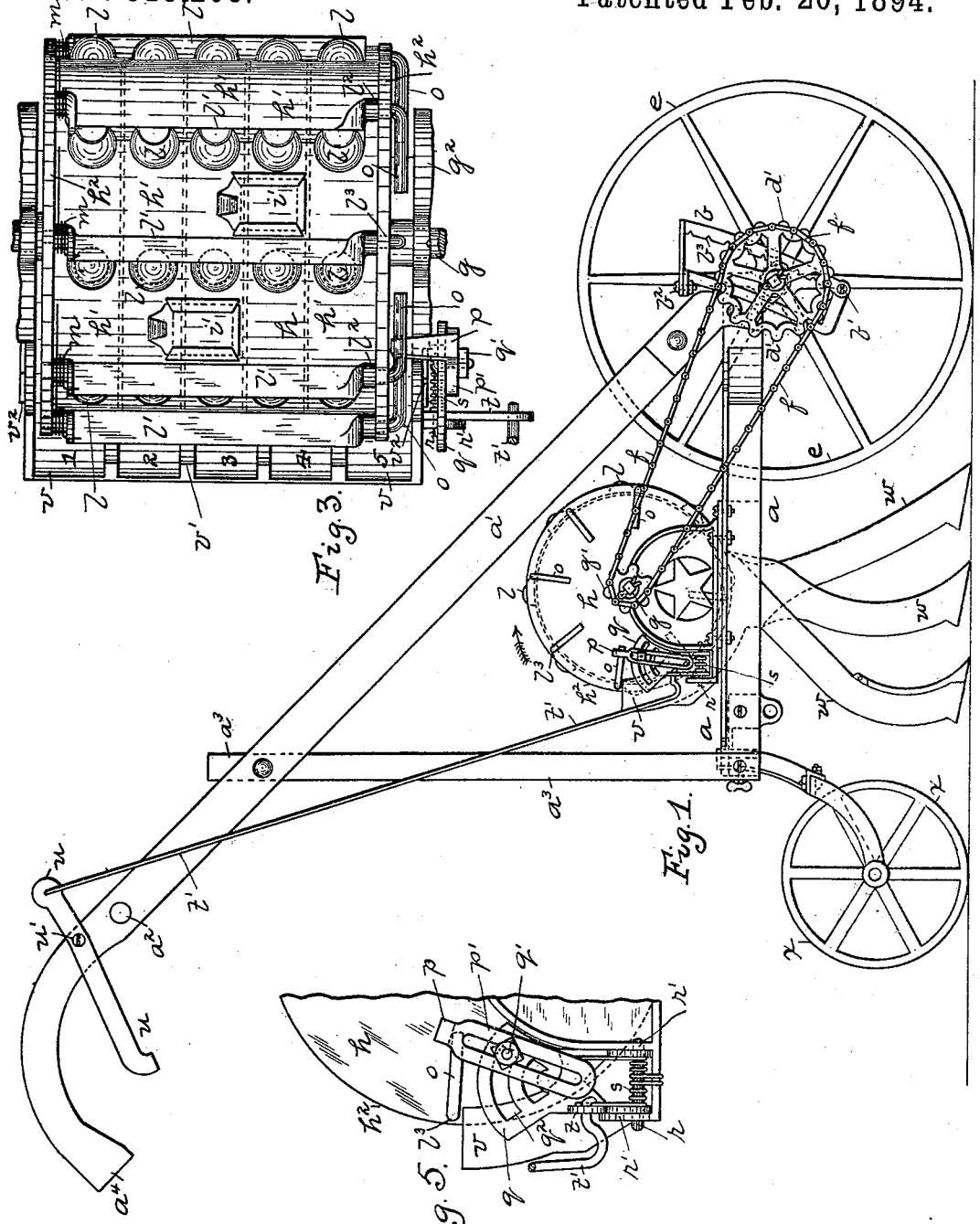
Witnesses:
Inventors
Joseph A. Gleixner
Peter Schaff
By Kay, Totten & Cooke
Attorneys

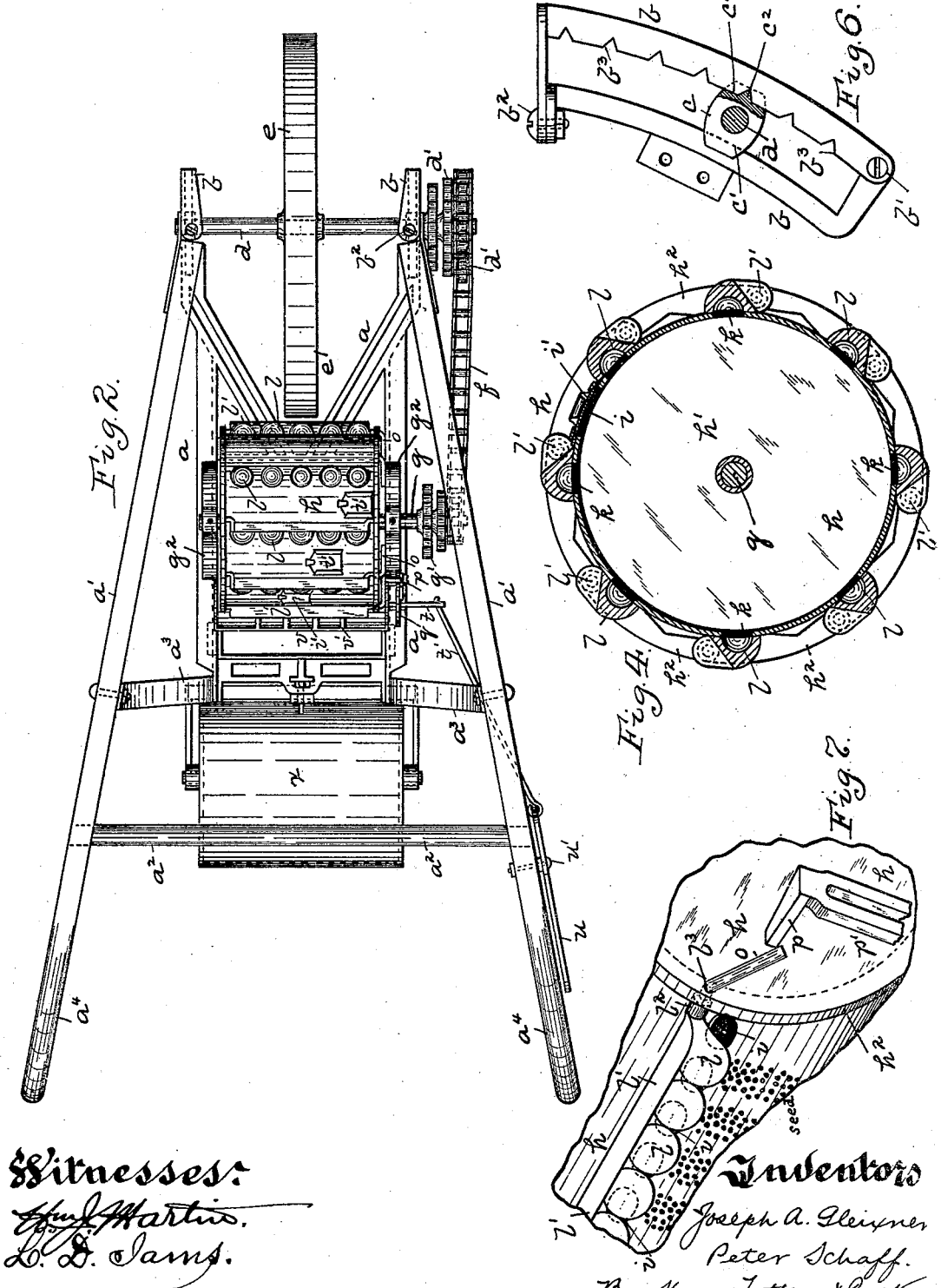

United States Patent Office.

JOSEPH A. GLEIXNER, OF FAIRHAVEN, AND PETER SCHAFF, OF BALDWIN, PENNSYLVANIA.

SEED-SOWER.

SPECIFICATION forming part of Letters Patent No. 515,208, dated February 20, 1894.

Application filed October 2, 1893. Serial No. 486,977. (No model.)

*To all whom it may concern:*

Be it known that we, JOSEPH A. GLEIXNER, a resident of Fairhaven, and PETER SCHAFF, a resident of Baldwin township, county of Allegheny, State of Pennsylvania, have invented a new and useful Improvement in Seed-Sowers; and we do hereby declare the following to be a full, clear, and exact description thereof.

Our invention relates to seed sowers, such as set forth in Letters Patent of the United States granted to us May 2, 1893, No. 496,515.

Our invention comprises certain improvements hereinafter clearly set forth.

To enable others skilled in the art to make and use our invention, we will describe the same more fully, referring to the accompanying drawings, in which—

Figure 1 is a side view of our improved seed sower. Fig. 2 is a top view. Fig. 3 is an enlarged plan view of the seed cylinder and its accompanying parts. Fig. 4 is an enlarged cross section of the seed cylinder. Fig. 5 is an enlarged view of the releasing device. Fig. 6 is an enlarged view of the segmental bearing which carries the axle. Fig. 7 is a perspective view of a portion of the cylinder showing the pocket opened to discharge the seed.

Like letters and numerals of reference indicate like parts in each of the figures.

The frame of the seed sower is composed of the bed $a$, the inclined bars $a'$ suitably braced by rods $a^2$ and $a^3$. The upper ends of said inclined bars $a'$ are curved to form handles $a^4$.

Secured to the forward end of the bed $a$ are the segmental bearings $b$. In describing the construction of these segmental bearings we will use the singular number. The segmental bearing $b$ is formed in two parts in order to provide for the adjustment of the journal box $c$ at different heights therein. The two parts of the bearing are joined at their lower ends by the pivotal joint $b'$ which acts in the nature of a hinge, so that when the upper ends are free the two parts of the bearing may be separated to provide for the adjustment of the journal box therein. The upper ends of the bearings $b$ are connected by the bolt and nut $b^2$, all of which is clearly shown in Fig. 6. Furthermore, one of the parts of the segmental bearing $b$ is provided with the serrated face $b^3$.

The journal box $c$ is provided with the recesses $c'$ within which the inner faces of the segmental bearing $b$ fit, whereby said box is firmly held within said bearing. To add to the security of the box $c$ one of the recesses of said box has formed therein the tooth $c^2$ adapted to engage with the serrated face $b^3$ of the bearing $b$. The journal boxes $c$ support the axle $d$ and secured to said axle is the wheel $e$. One end of said axle has secured thereto the sprocket wheels $d'$. A sprocket chain $f$ connects the sprocket wheels $d'$ with similar wheels $g'$ on the shaft $g$ which carries the seed cylinder $h$. The shaft $g$ is journaled in suitable bearings $g^2$ on the bed $a$, and secured to said shaft is the seed cylinder $h$. The seed cylinder $h$ may be divided into compartments $h'$, as shown in dotted lines in Fig. 3, in order that different kinds of seeds may be sown at the same time. Access to each compartment is had by means of the openings $i$ formed in the walls of said cylinder, said openings being provided with the sliding covers $i'$. Through the openings $i$ the seeds may be fed to the different compartments $h'$. The seed cylinder $h$ is furthermore provided with the openings $k$ arranged in series extending across the cylinder, said series being arranged at suitable intervals around the circumference of said cylinder, and the openings in one series following in line with those of the preceding series. The openings $k$ lead into the different compartments of the cylinder $h$.

Each series of openings $k$ is provided with a corresponding number of pockets $l$. These pockets $l$ are mounted on a common bar $l'$, said bar having journals $l^2$ on the ends thereof journaled in suitable bearings $l^3$ in the flanges $h^2$ of the cylinder $h$. In order to retain the pockets $l$ normally in such position as to close the openings $k$ we provide a spring $m$, said spring being secured to the bar $l'$ and encircling the journal $l^2$ with the free end thereof in contact with the cylinder $h$.

Projecting from one end of the bar $l'$ is the arm $o$ adapted to be engaged by a finger $p$ upon the revolution of the cylinder $h$, whereupon the pockets $l$ will discharge the seed to the drills, as will be more fully hereinafter set forth. This finger $p$ extends out from a slotted arm $p'$ which is secured to the segmental arm $q$, a thumb nut $q'$ engaging with said slotted arm $p'$ and with a slot $q^2$ in said segmental arm $q$. By this construction the finger $p$ may be raised or lowered or shifted to the right or left according as the thumb nut $q'$, which holds said finger in position, is moved to the right or left within the slot $q^2$ in the segmental arm $q$. A bolt or pin $r$ passes through the lower end of the segmental arm $q$, said bolt or pin being journaled in bearings $r'$ on the bed $a$. A suitable spring $s$ encircling the bolt or pin $r$ acts to retain the segmental arm $q$ in an upright position and the finger $p$, carried thereby, in such proximity to the cylinder $h$ that upon the revolution of said cylinder the finger $p$ will be in the path of the arm $o$, whereupon said arm $o$ will be forced back until the finger $p$ has been passed, when said arm $o$ will resume its former position. The segmental arm $q$ has an outwardly projecting tongue $t$ to which is secured the rod $t'$, said rod extending up and secured to the lever $u$ pivoted at $u'$ to one of the inclined bars $a'$ of the frame. By means of this construction the operator, by raising the lever $u$, draws down the segmental arm $q$, and at the same time the finger $p$ out of the path of the arm $o$ on the revolving cylinder $h$. Back of the cylinder $h$, and secured to the bed $a$, is the chute $v$, said chute having the partitions $v'$ therein which form a series of small chutes 1, 2, 3, 4, &c. These chutes 1, 2, 3, &c., register at their lower ends with the inlets of the seed drills $w$, each chute leading down to its particular drill. The said chute $v$ may be arranged to slide in suitable guides $v^2$ secured to the bed $a$. These drills are of the ordinary construction and may be secured in place on the bed $a$ in any convenient manner.

A marker, such as shown in the Letters Patent above referred to, may be used in connection with the present invention.

The rear roller $x$ may be adjusted at different heights to correspond with the height to which the front wheel $e$ is adjusted, the purpose of said roller $x$ being to roll over the ground traversed by the drills and cover the seed expelled therefrom.

The operation of our improved seed sower is as follows:—The wheel $e$ and rear roller $x$ having been adjusted at the proper height relative to the depth at which it is desired to sow the seed, and the seed, all of one kind or of different kinds as the case may be, having been introduced into the cylinder $h$ by means of the openings $i$, the sower is then ready for sowing. As the operator pushes the sower over the soil the cylinder $h$, through the axle $d$, sprocket wheels $d'$, chain $f$ and sprocket wheels $g'$, is caused to rotate in the direction of the arrow. It is apparent that upon the ascent of the cylinder $h$ the pockets $l$ will be filled with seed, that is, the pockets on that portion of said cylinder from the point where the cylinder begins its ascent to a point just beyond the chute $v$ where the pockets begin to empty the seed back into the cylinder. The ascent of the cylinder $h$ brings the arm $o$ into contact with the finger $p$, whereupon the said arm $o$ is forced back, causing the bar $l'$ to turn slightly in its bearings and allow the pockets $l$ to deliver their contents into their respective chutes 1, 2, 3, 4, 5. The arm $o$ having passed over the finger $p$ will be forced back to its normal position by means of the spring $m$ and the pockets $l$ will likewise resume their normal position over the openings $k$. The seed delivered to the chutes 1, 2, 3, &c., by the pockets $l$ will pass down and out the seed drills $w$ into the soil. When it is not desired to empty the pockets $l$ into the chutes, such as in transporting the sower to and from the place where the sowing is to be done, the operator by grasping the lever $u$ and raising the same throws the finger $p$ away from the cylinder and out of the path of the arm $o$.

In some cases it is desirable to sow more seed than in others, according to the kind of seed, and for this reason the arm $p'$ with the finger $p$ can be adjusted at different heights or at different angles with reference to the segmental arm $q$. It is apparent that the lower the position of said finger $p$ the sooner the arm $o$ will come in contact with said finger and the entire contents of the pockets will be discharged into the chutes. It is further apparent that if the finger $p$ is adjusted in such position as to strike the arm $o$ near the inner end of said arm, the pockets will be opened to their full extent and for a greater length of time than where said finger strikes the outer end of said arm $o$. In the latter case the pockets will only be partially opened and that for a short time whereby only a portion of the seed held therein will escape. This adjustment is also of great advantage in sowing seed of different sizes, as in the case of large seed it is desirable to open the pockets to the full extent.

What we claim as our invention, and desire to secure by Letters Patent, is—

1. In seed sowers, the combination of a frame having slotted or segmental bearings at the forward end, said bearings being partible and hinged together, and a driving wheel having journal blocks, said blocks having recesses formed therein to engage the inner faces of said bearings, substantially as and for the purposes set forth.

2. In seed sowers, the combination of a frame having slotted or segmental bearings at the forward end, said bearings being partible and hinged together, one of the inner faces thereof being serrated, a driving wheel having journal blocks, said blocks having recesses formed therein to engage the inner faces of said bearings, one of said recesses having a tooth therein to engage the serrated face of said bearing blocks, substantially as and for the purposes set forth.

3. In seed sowers, the combination of a frame having a series of drills, a revolving cylinder having an opening formed therein, a spring actuated bar journaled on the exterior of said cylinder and parallel with the axis thereof, a pocket on said bar covering said opening, and mechanism for turning said bar upon the revolution of said cylinder whereby said pocket is raised, substantially as and for the purposes set forth.

4. In seed sowers, the combination of a frame having a series of drills, a revolving cylinder having an opening formed therein, a spring actuated bar journaled on the exterior of said cylinder and parallel with the axis thereof, a pocket on said bar covering said opening, and an arm projecting from one end of said bar toward the axis of said cylinder, and mechanism for moving said arm upon the revolution of said cylinder whereby said bar is turned and said pocket is lifted from said opening, substantially as and for the purposes set forth.

5. In seed sowers, the combination of a frame having a series of drills, a revolving cylinder having an opening formed therein, a spring actuated bar journaled on the exterior of said cylinder and parallel with the axis thereof, a pocket on said bar covering said opening, an arm projecting from one end of said bar toward the axis of the cylinder, and a finger in the path of said arm, substantially as and for the purposes set forth.

6. In seed sowers, the combination of a frame having a series of drills, a revolving cylinder having an opening formed therein, a spring actuated bar carrying a pocket covering said opening, an arm projecting from said bar, a slotted segmental arm on said frame, a slotted arm secured thereto, and a finger on said slotted arm in the path of said first mentioned arm, substantially as and for the purposes set forth.

7. In seed sowers, the combination of a frame having a series of drills, a revolving cylinder having an opening formed therein, a spring actuated bar carrying a pocket covering said opening, an arm projecting from said bar, a slotted segmental arm journaled in said frame, a slotted arm secured to said segmental arm, a finger on said slotted arm, and a spring for holding said finger in the path of said first mentioned arm, substantially as and for the purposes set forth.

8. In seed sowers, the combination of a frame having a series of drills, a revolving cylinder having an opening formed therein, a spring actuated bar carrying a pocket covering said opening, an arm projecting from said bar, a slotted segmental arm journaled in said frame, a slotted arm secured to said segmental arm, a finger on said slotted arm, a spring for holding said finger in the path of said first mentioned arm, and mechanism for withdrawing said finger from said arm, substantially as and for the purposes set forth.

9. In seed sowers, the combination of the revolving cylinder $h$ having openings $k$ and compartments $h'$, the bar $l'$ carrying the pockets $l$, the spring $m$, the arm $o$, the segmental arm $q$, the spring $s$, the slotted arm $p'$ and finger $p$, substantially as and for the purposes set forth.

In testimony whereof we, the said JOSEPH A. GLEIXNER and PETER SCHAFF, have hereunto set our hands.

JOSEPH A. GLEIXNER.
PETER SCHAFF.

Witnesses:
J. N. COOKE,
ROBT. D. TOTTEN.